Patented Nov. 27, 1934

1,981,926

UNITED STATES PATENT OFFICE 1,981,926

INSECTICIDE

Joseph Savage, Runcorn, Fred Holt, Weybridge, and Richard Thomas, Stockton-on-Tees, England, assignors to Imperial Chemical Industries Limited, a corporation of Great Britain No Drawing. Application August 20, 1931, Serial No. 558,332. In Great Britain August 23, 1930

10 Claims. (Cl. 167—22)

This invention relates to improvements in insecticides and it is the main object of the invention to provide a solid insecticide, containing large proportions of liquid insecticides such as alpha-chlornaphthalene, tetrachlorethane or ortho-dichlorbenzene and suitable for use as a soil fumigant.

When benzene is chlorinated to produce dichlorbenzene a mixture of para-dichlorbenzene and ortho-dichlorbenzene is formed. Para-dichlorbenzene is a solid insecticide and finds use as a soil fumigant, being injected into the soil for this purpose, e. g. by means of the Jarvis injector. Ortho-dichlorbenzene is an insecticide but is a liquid and cannot be used in the same way as para-dichlorbenzene.

According to the present invention, a solid insecticide suitable for use as a soil fumigant is obtained by reacting upon a mixture of a liquid insecticide such as ortho-dichlorbenzene, alpha-chlornaphthalene or tetrachlorethane and/or a solid insecticide, such as para-dichlorbenzene, hexachlorethane, or naphthalene; and a vulcanizable oil such as raw linseed oil, or sardine oil, or herring oil or whale oil, or mixtures of two or more of these oils, with sulphur chloride. The known reaction between these oils and sulphur chloride sets in readily with the evolution of hydrochloric acid gas, leaving a solid mass which may be ground to a convenient size. Traces of residual acid are preferably neutralized by mixing the ground product with a small proportion of a solid base, preferably tricalcium phosphate.

The invention also consists in a cold-vulcanized oil containing an insecticide such as a chlorinated hydrocarbon or preferably a mixture of a liquid and solid insecticide.

Example 1

Eleven parts by weight of the mixture obtained by chlorinating benzene to the dichlor stage are mixed with 2 parts of linseed oil and 1 part of sulphur monochloride. On mixing, hydrochloric acid gas is liberated and within an hour the mixture begins to set and quickly becomes a hard mass. When the reaction is complete the mass is ground to a convenient size. The product is dry and friable, is of a yellow or brown color and crystals of para-dichlorbenzene can be seen held in the solid lactice. Any traces of hydrochloric acid which may be present subsequent to grinding are neutralized by the incorporation of a small amount of calcium phosphate e. g. 1 per cent by weight.

Similar products are obtained by using 11 parts of mixtures containing, (a) 35 per cent ortho-dichlorbenzene
    65 per cent para-dichlorbenzene
(b) 60 per cent ortho-dichlorbenzene
    40 per cent para-dichlorbenzene
(c) 80 per cent ortho-dichlorbenzene
    20 per cent para-dichlorbenzene
(d) 60 per cent ortho-dichlorbenzene
    40 per cent naphthalene
(e) 60 per cent alpha-chlornaphthalene
    40 per cent naphthalene
(f) 50 per cent tetrachlorethane
    50 per cent hexachlorethane These various mixtures set in from 7 to 30 minutes giving yellow or brown products which are dry and friable.

Example 2

Similar results are obtained by working as in Example 1 but replacing the 2 parts of raw linseed oil by (1) A mixture of 1 part of raw linseed oil and 1 part of Japanese pale sardine oil,
(2) 2 parts of herring oil,
(3) A mixture of 1 part of raw linseed oil and 1 part of herring oil.

Among the advantages of the invention may be mentioned that where hitherto it has been advantageous to use a solid insecticide or soil fumigant, choice has been limited to solid bodies of the nature of naphthalene, para-dichlorbenzene, etc. By the present method it is possible to use the mixed dichlorbenzenes obtained in the usual manner, thus giving a cheaper material and avoiding the rejection of the ortho-dichlorbenzene. Further, when using para-dichlorbenzene alone as an insecticide it disappears by evaporation in about a fortnight; the present insecticide evaporates more slowly so that the effective period of action is increased.

It is preferable to use a solid as well as a liquid insecticide, since the solid crystals assist in making the mass friable. In the absence of solid insecticide, it is necessary to use far less total quantity of insecticide, because otherwise a sticky instead of a friable mass is obtained—hence the product is less active as the percentage content of insecticides is lower. Thus the addition of solid insecticide is regarded as most important.

We claim:

1. The process of producing a dry, friable insecticide which comprises reacting with sulfur chloride a vulcanizable oil containing a chlorinated hydrocarbon and comminuting the reaction products.

2. The process of producing a solid insecticide which comprises reacting sulfur chloride with a vulcanizable oil containing a liquid chlorinated hydrocarbon.

3. The process of producing a solid insecticide which comprises reacting sulfur chloride with a vulcanizable oil containing a solid chlorinated hydrocarbon.

4. The process of claim 2 in which the liquid chlorinated hydrocarbon is taken from a group consisting of ortho-dichlor-benzene, alpha-chlornaphthalene, and tetrachlorethane.

5. The process of claim 3 in which the solid chlorinated hydrocarbon is taken from a group consisting of para-dichlorbenzene, hexachlorethane, and chlor-naphthalene.

6. A cold-vulcanized oil containing a chlorinated hydrocarbon.

7. A cold-vulcanized oil containing a mixture of a liquid and solid chlorinated hydrocarbon.

8. A solid insecticide comprising a chlorinated hydrocarbon and a cold-vulcanized oil.

9. The product of claim 8 in which the chlorinated hydrocarbon is taken from a group consisting of ortho-dichlorbenzene, alpha-chlornaphthalene, and tetrachlorethane.

10. The product of claim 8 in which the chlorinated hydrocarbon comprises a mixture of ortho and para dichlorbenzenes.

JOSEPH SAVAGE.
FRED HOLT.
RICHARD THOMAS.